| United States Patent [19] | [11] | 4,120,289 |
|---|---|---|
| Bottum | [45] | Oct. 17, 1978 |

[54] REFRIGERANT CHARGED SOLAR WATER HEATING STRUCTURE AND SYSTEM

[76] Inventor: Edward W. Bottum, 9357 Spencer Rd., Brighton, Mich. 48116

[21] Appl. No.: 789,010

[22] Filed: Apr. 20, 1977

[51] Int. Cl.$^2$ ............................................... F24J 3/02
[52] U.S. Cl. .................................... 126/271; 237/1 A
[58] Field of Search ...................... 126/270, 271, 400; 237/1 A

[56] References Cited

U.S. PATENT DOCUMENTS

| 3,152,442 | 10/1964 | Rowekamp | 126/271 |
| 3,390,672 | 7/1968 | Snelling | 126/271 |
| 4,000,851 | 1/1977 | Heilemann | 237/1 A |
| 4,011,731 | 3/1977 | Meckler | 126/271 |
| 4,062,349 | 12/1977 | Birnbreier | 126/271 |

Primary Examiner—Kenneth W. Sprague
Attorney, Agent, or Firm—Whittemore, Hulbert & Belknap

[57] ABSTRACT

A refrigerant charged solar water heating structure and system is provided for use in heating water. The solar heating system comprises a solar collector structure operatively connected to a heat exchange structure having means for heating water passing therethrough. Refrigerant is used in the system. The refrigerant is boiled in the collector and condensed in the heat exchange structure to give off heat.

3 Claims, 6 Drawing Figures

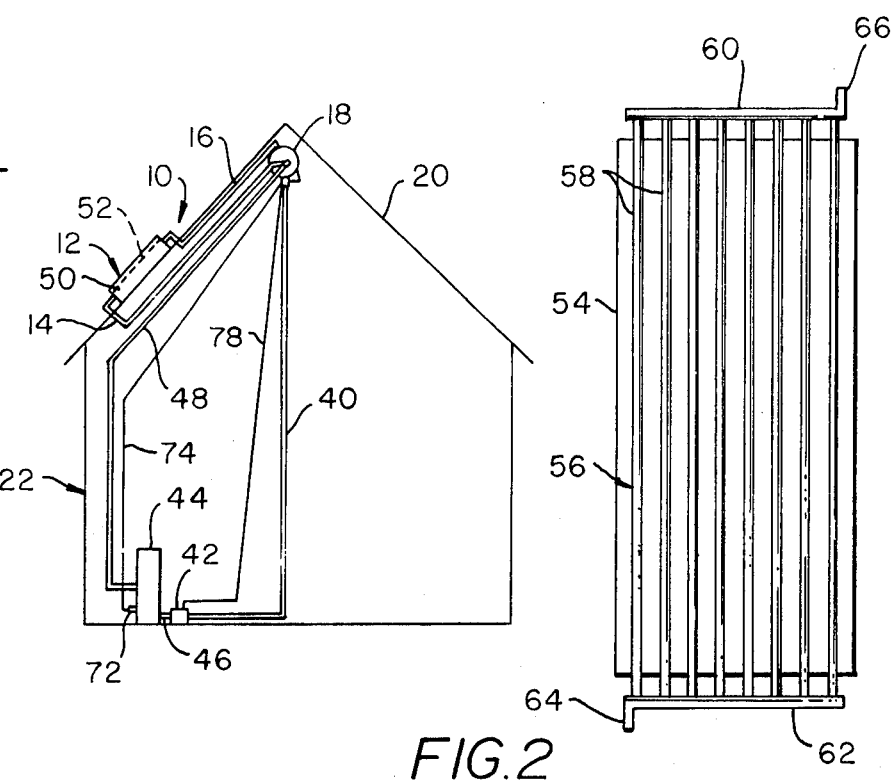
FIG.1
FIG.2
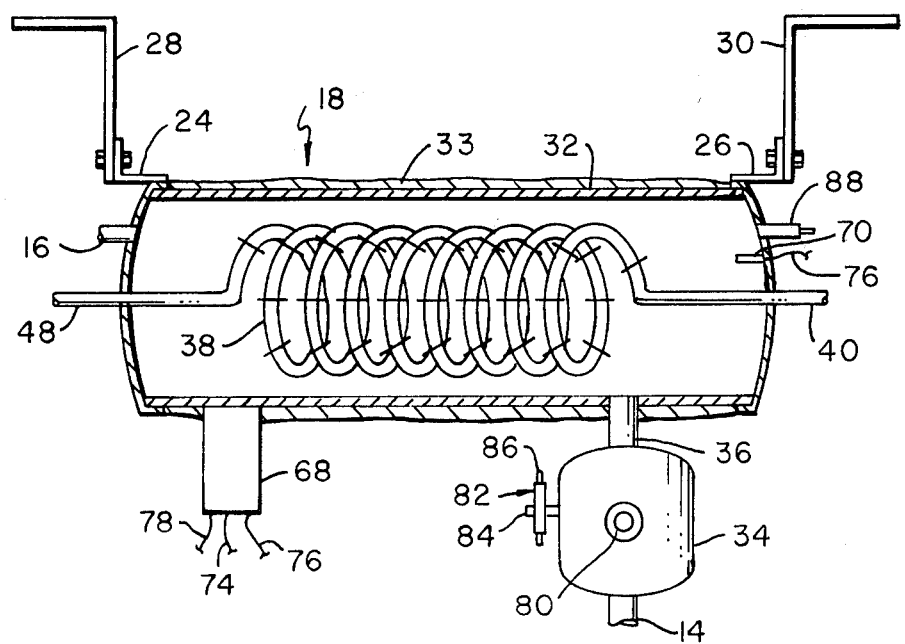
FIG.3

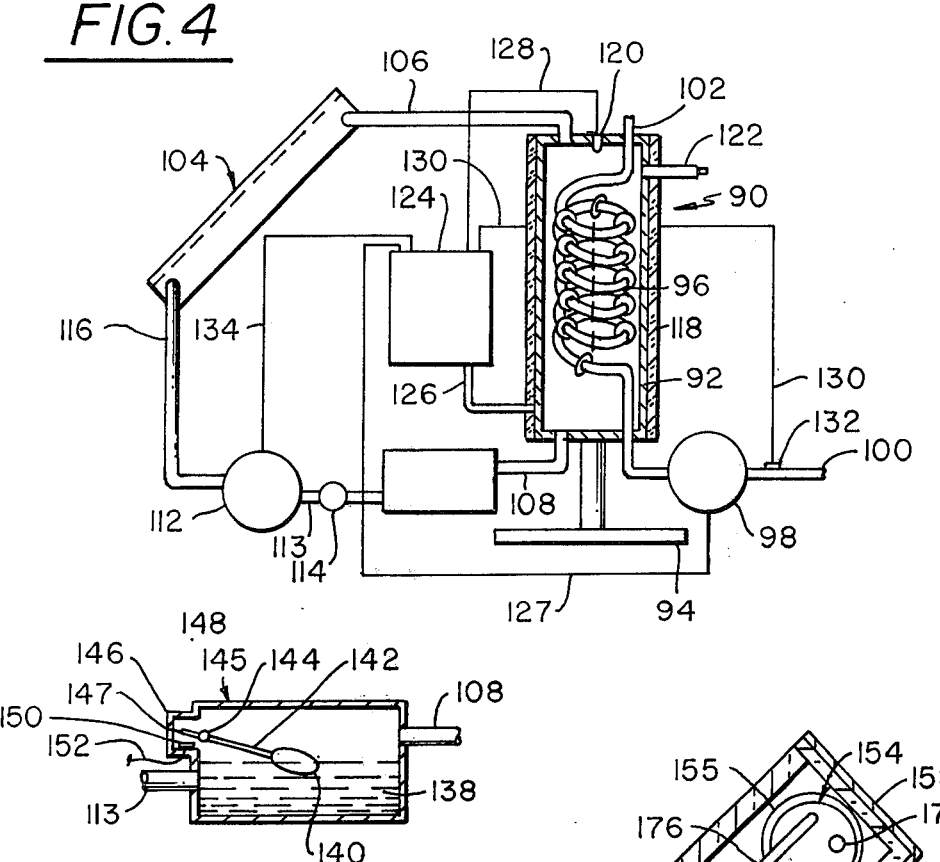
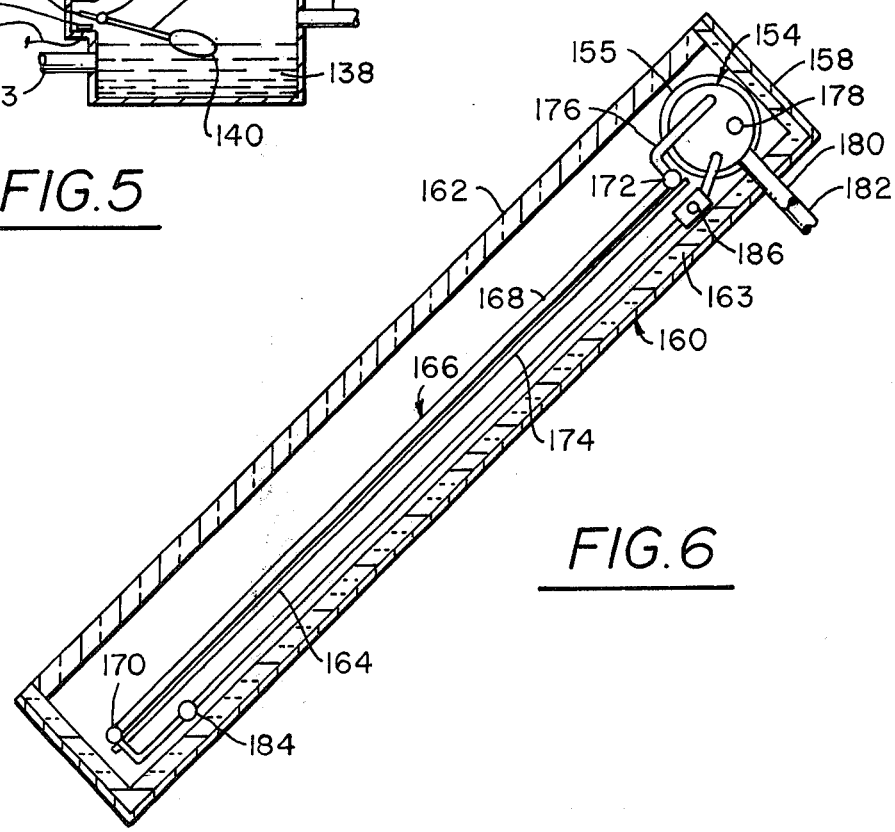

REFRIGERANT CHARGED SOLAR WATER HEATING STRUCTURE AND SYSTEM

BACKGROUND OF THE INVENTION

Solar heating systems in the past have been completely filled with a collector fluid, except for a small expansion volume in the surge tank.

As I have disclosed in my copending application, Ser. No. 775,731, filed Mar. 9, 1977, the present solar heating system departs from past practice in that a refrigerant, such as the fluorinated hydrocarbons, is used as the collector fluid. Only the collector is filled with liquid refrigerant, the balance of the system containing refrigerant gas according to the pressure-temperature relationship of the refrigerant. Normally, there are no pressure reducing valves or regulating valves used in the system. The entire system being basically under the same pressure, such control devices may be dispensed with. However, this is not to exclude the use of such structure under certain conditions. The pressure will be determined by the condensing temperature in the heat exchange structure.

In past practice the sensible heat of the collector fluid is raised in the collector as heat is picked up. The collector fluid is then circulated by a pump (using some energy) to a heat exchanger or heat dissipating or storing device.

In this invention latent heat of the refrigerant is picked up causing the liquid refrigerant to "boil" and change to vapor according to the amount of heat picked up. Vapor pressure immediately travels to the heat exchange structure where it condenses and returns as a liquid to the collector, this being a continuous procedure as long as heat is being absorbed by the collector.

Now, since latent heat is being used for heat movement instead of sensible heat, if the load at the heat exchange structure is equal to the heat input at the collector, the pressure in the system will remain constant and not increase. Therefore, the collector plate temperature can remain lower than in old style systems where sensible heat is picked up. Since the ΔT in the collector is greater, the efficiency of a collector can be much greater than for old style collector fluid charged systems.

Also, the response to sudden bursts of sunlight is almost instantaneous in a refrigerant charged system and it will be picking up and transferring usable heat before the old style collector fluid charged system can get started.

Whenever the heat exchange structure is located above the collector, a circulating pump can usually be eliminated. When desired to locate the heat exchange structure below or near the same height as heat pick up, a small refrigerant circulating pump is used. However, since latent heat of the refrigerant is used for heat movement instead of sensible heat, a relatively small weight of refrigerant needs to be circulated and very little power is required.

The present invention comprises a package which may be installed with collectors and the entire system charged with refrigerant for use in heating water.

The use of a refrigerant charged solar system instead of a collector fluid has many advantages, some of which are listed below:

(1) Refrigerant in such a system eliminates forever all worry about freezing because the refrigerant does not freeze.

(2) Also, it eliminates any question as to corrosion or chemical action in the collector or water heating system.

(3) Toxicity is not a problem since most refrigerants are non-toxic.

(4) Refrigerant charged collectors respond faster and are, therefore, more efficient on cloudy days.

(5) A refrigerant charged system is more efficient since basically latent heat is used instead of sensible heat as in the case of the collector fluid. This, in many cases, results in the heat being moved through smaller lines and longer distances without expenditure of energy to run a pump.

(6) In many cases, a primary circulating pump can be eliminated and a very efficient passive system can result.

(7) Low grade heat for use with heat pumps may be more readily picked up with a refrigerant charged system.

(8) Refrigerants are readily available and some collector fluids are not. The cost is usually less when charging with a refrigerant since refrigerants are produced in high production and are readily available and fewer pounds are used because the system is not flooded.

(9) It is relatively easy to find leaks in a system charged with refrigerant since a conventional leak detector may be used.

(10) A heat exchanger in a refrigerant charged system is more efficient since the temperature remains a maximum throughout the heat exchanger chamber. Both inlet and outlet are at the same temperature while in a liquid to liquid heat exchanger this varies throughout.

SUMMARY OF THE INVENTION

The solar water heating system comprises a solar collector structure and a heat exchange structure. The heat exchange structure comprises a closed vessel with tubular means therewithin. The tubular means have inlet and outlet means extending from the vessel. Water storage means are provided. The inlet and outlet means are connected to the water storage means. Pump means are connected in the inlet means between the tubular means and the water storage means for circulation of water from the water storage means through the tubular means to heat the water. The water is then circulated back to the water storage means. Means are provided for circulating a refrigerant heat transfer medium in gaseous form from the collector structure to the interior of the closed vessel and in liquid form from the closed vessel to the collector structure, thereby forming a solar energy system. A refrigerant heat transfer medium is provided in the solar energy system. The solar collector is located to receive sun rays.

IN THE DRAWINGS

FIG. 1 is a diagrammatic view in elevation of one embodiment of a refrigerant charged solar water heating structure and system in accordance with the present invention;

FIG. 2 is a top plan view of one embodiment of a solar collector plate structure for use in the present invention;

FIG. 3 is a sectional view of the heat exchange structure utilized in the FIG. 1 embodiment;

FIG. 4 is a diagrammatic view in elevation of another embodiment of a refrigerant charged solar water heating structure and system;

FIG. 5 is a sectional view of a receiver incorporating a float construction utilized for control purposes; and FIG. 6 is a sectional view of another embodiment of a refrigerant charged solar water heating structure and system in accordance with the present invention.

Referring to FIGS. 1-3, the solar energy system 10 comprises a solar collector 12 which includes an internal tubular structure. The inlet and outlet of the collector 12 are connected to, respectively, conduits 14, 16. A heat exchange structure 18 is provided above the collector 12. The solar collector 12 is illustratively mounted on gabled roof 20 of house 22 in a position to receive the sun's rays. As will be perceived, the collector 12 is thus positioned at an upward angle. The heat exchange structure 18 has brackets 24, 26 which are bolted to brackets 28, 30. The brackets 28, 30 are attached to the inside of the ridge board or to the house joists in a convenient position.

The heat exchange structure 18 includes a closed vessel 32 having insulation 33 therearound. Conduit 16 is in direct communication with the interior of vessel 32. Conduit 14 extends from a receiver 34 which is connected to the bottom of vessel 32 by conduit 36.

A finned tubular coil 38 is provided interiorly of vessel 32. The inlet of coil 38 is connected to conduit 40 which in turn is connected to a pump 42 located adjacent to hot water tank 44 provided on the lower floor of the house. The pump is connected to the tank via conduit 46. Conduit 46 is at the lower end of the tank so as to extract relatively cold water from the tank. The outlet of the coil 38 is connected to the upper end of the tank 44 via conduit 48.

The solar energy system 10 is charged with standard refrigerant fluid as disclosed in my copending application, Ser. No. 775,731, filed Mar. 9, 1977. In the past, the heat transfer mediums in use for solar heating systems have been such as brine water, ethylene glycol, silicone-type liquid fluids, and the like. Certain problems, such as freezing at extremely low temperatures and corrosion of parts, have been encountered with these mediums. Also, certain inefficiencies resulting from the fact that these mediums absorb and give out sensible heat are inherent. Absorption of heat results in raising the temperature and extraction of heat results in lowering the temperature of such mediums. This means that relatively large amounts must be circulated and that the temperature of the collector surface must be fairly high in order that large amounts of heat may be transferred. Further, normally required use of anti-freeze considerably lowers heat transfer efficiency.

In the present invention, standard refrigerant fluid suitable for use in refrigeration, normally fluorinated hydrocarbons, is used as the heat exchange medium. The refrigerant changes from a liquid to a gas in the collector 12; in essence, it boils. Thus, it is the latent heat causing evaporation, not sensible heat, which is absorbed by the refrigerant in the collector 12. The collector plate will run cooler than conventional systems while at the same time transferring more heat. Also, less amounts of fluid need be pumped, when pumping is necessary, thereby reducing pump size and energy use thereof, because more heat is absorbed in smaller volume of medium. Also, since the entire system is substantially under one pressure, the pump does not use appreciable power as when pumping against a head.

When the evaporated refrigerant moves by vapor pressure through vessel 32, it condenses into a liquid. In so doing, it gives off the latent heat of the refrigerant as desired to heat the water passing through coil 38.

The collector 12 is of the type wherein the lower portion may be flooded with liquid refrigerant while the upper portion receives the gaseous refrigerant. Referring to FIGS. 1 and 2, the collector comprises a casing 50 having a transparent plate 52 through which the sun's rays pass. Inside the casing 50 is a metal plate 54, normally blackened to result in maximum absorption of sun rays.

A tubular structure 56 is secured on the face of plate 54 in heat transfer relation thereto. The structure 56 comprises a plurality of parallel tubes 58 connected at each end by tubular manifolds 60, 62. Conduit 14 is connected to inlet 64 and conduit 16 is connected to outlet 66.

As will be appreciated, when collector 12 is positioned as in FIG. 1, liquid refrigerant may flood the lower portions of tubes 58 while gaseous refrigerant may boil into the upper portions. In most portions of collector 12, this result would occur. A thin, flat vessel could be used instead of tubular structure 56.

As will be appreciated, several collectors 12 may be connected together in a bank.

As will be noted in FIG. 3, the vessel 32 is for horizontal mounting. It is particularly intended that this structure be used with collectors which are mounted on the outside of the roof with lines running through the roof to the heat exchange structure 18 which is mounted horizontally just below the ridge board.

A differential control is provided for starting and stopping operation of the system. The differential control includes a conventional differential control actuating structure 68 which is directly mounted on the underside of vessel 32. A temperature sensor 70 is provided at one end of vessel 32 to sense the temperature of the interior of the vessel. Another temperature sensor 72 is provided on the lower portion of hot water tank 44. These sensors are connected to the differential control structure 68 via leads 74, 76. A lead 78 extends from structure 68 to the electric motor of pump 72 control mechanism. When the differential between the temperature of the water and the interior of the vessel 32 is quite small, the structure 68 signals the pump motor to discontinue the operation of the pump because efficient transfer heat cannot take place. The reverse occurs when the differential in temperature increases to a point where efficient heat exchange can take place. Additionally, the differential control structure 68 will cause the pump to deactivate when the temperature of water in the tank has reached a desired point. Also, a solenoid or other valve may be placed in conduit 14 to discontinue operation of the solar energy system when water is not to be heated. In this respect, the volume contained in the vessel 32 should always be greater than the total volume of the collector 12. In this way, if it is desired, a pressure or temperature control valve in conduit 14 returning to the collector 12 can be installed so that when the solar system is to be deenergized the valve can be closed, shutting off flow of refrigerant to the collector 12. The refrigerant liquid will then condense into vessel 32 and the system will cease to operate until the relevant temperature has fallen.

The receiver 34 is what is termed a "bullseye" receiver having a sight glass 80 so that the liquid in the receiver may be observed. The receiver is provided with a service valve 82 having a charging and discharging fitting 84 and a fitting 86 at the top which may mount a pressure gage if desired. A pressure relief valve 88 is provided on vessel 32 as a safety measure.

In operation of the system, liquid refrigerant is boiled in the collector 12 when the sun's rays shine thereon. The gaseous refrigerant passes to the vessel 32 as a consequence of its own vapor pressure. It is not pumped by external means. The gaseous refrigerant condenses in vessel 32, thus giving off heat. This heat raises the temperature of water passing through coil 38. The liquid refrigerant then returns to collector 12 via receiver 34 by means of gravity, it being remembered that vessel 32 is located above collector 12.

Referring to FIG. 4, a vertically oriented heat exchange structure 90 is illustrated. The structure 90 includes closed vessel 92 which has its longitudinal axis in a vertical direction. The vessel 92 is provided with a stand 94 for floor mounting. It may, for example, be located on a floor in house 22. A finned tubular coil 96 is provided within vessel 92. Water is pumped through coil 96 by pump 98, the inlet conduit 100 of which is connected to the lower portion of a hot water tank as previously described. The outlet of the coil 96 provides a return to the hot water tank via conduit 102.

A solar collector 104 of the type previously described has its outlet connected to the upper end of vessel 92 by means of conduit 106. Conduit 108 extends from the lower end of vessel 92 into connection with a receiver 110. The outlet of the receiver is connected to a small refrigerant recirculating pump 112 by conduit 113. A check valve 114 is provided in conduit 113. The outlet of pump 112 is connected to the lower portion of the collector 104 by means of conduit 116. The collector 104 is located outdoors to receive sun rays. It may be mounted, for example, in a backyard or on a roof.

The exterior of vessel 92 is provided with heat insulating material 118. Such insulating material may also be provided around the vessel 32 of FIG. 3. A temperature sensor 120 is provided in the upper end of vessel 92. A pressure relief valve 122 is provided in the upper end of vessel 92.

A differential control structure 124 is mounted on vessel 92 by means of structure 126. One lead 128 connects structure 124 to sensor 120. Another lead 130 connects the structure 124 to a temperature sensor 132 located to sense the temperature of water being pumped into coil 96 from the hot water tank. An output lead 134 extends from structure 126 to the electric motor of pump 112. A second output lead 127 extends to the electric motor control mechanism of pump 98. Again, when the temperature differential between the refrigerant in vessel 92 and the water flowing through coil 96 is not sufficient for efficient heat exchange, both of the pumps 98, 112 will deactivate. These pumps are also deactivated when the temperature of the water in the hot water tank has reached the desired level.

The reason for having to provide pump 112 for the recirculation of refrigerant is that, as will be noted, the vessel 92 is located at or below the level of the collector 104. Thus, liquid refrigerant will not flow by gravity back to the collector 12. Therefore, it is necessary to pump it back. However, such a pump is of quite small capacity and has a very low utilization of energy.

The check valve 114 is necessary in some instances, depending upon the relative positions of the solar collector and heat exchange structure. The check valve insures that the collector will be fully charged without flooding vessel 92.

The system shown in FIG. 4 operates in all substantial respects in the manner described in connection with the system of FIG. 1.

One desired structure for controlling operation of the pump 112 relative to the liquid level in the receiver is illustrated in FIG. 5. As shown therein, the receiver 145 which is connected to the outlet of vessel 92 is adapted to be partially filled with liquid refrigerant 138. A float 140 having a stem 142 is hingedly mounted at 144. A contact 147 extends exteriorly of the main receiver housing into small housing addition 146. A second electrical contact 148 is situated within housing portion 146. When the level of liquid refrigerant rises to a predetermined level in the receiver, the contacts 147, 148 will close. A lead 150 extends from contact 148 to close a circuit through lead 152 extending from contact 14. Closure of this circuit is effective to activate pump 112 and cause flow of liquid refrigerant to the collector. This control is provided to prevent pump 112 from running dry. The liquid level control of FIG. 5 may be integrated if desired into the control system of FIG. 4.

It should also be noted that with either the horizontal mount shown in FIG. 1 or the vertical mount shown in FIG. 4, flare fittings may be used for the refrigerant connections and will usually be preferred. Also, rotolock type fittings may be used. Also, special fittings may be used and precharged lines used to connect the collectors and the water heating package. In other words, the collector may be precharged with the correct amount of refrigerant, the water heating package may be precharged, and the lines connecting them may be precharged so that in the field it is only necessary to connect these lines together. It will then not be necessary to evacuate and charge the system with refrigerant in the field.

FIG. 6 illustrates an embodiment where heat exchange structure 154 is directly mounted within casing 158 of solar collector 160. The structure 154 has external heat insulation 155. The heat exchange structure 154 includes a tubular coil and vessel as previously described in connection with the horizontal and vertical models of FIGS. 3 and 4. Again, the collector 160 is of the type wherein the lower portion may be flooded with liquid refrigerant while the upper portion or manifold 172 receives gaseous refrigerant. The collector comprises the casing 158 having a transparent plate 162 through which the sun's rays pass. Heat insulation 163 is provided. Inside the casing 158 is the metal plate 164, normally blackened to result in maximum absorption of sun rays. Tubular structure 166 is secured on the face of plate 164 in heat transfer relation thereto. The structure 166 comprises a plurality of parallel tubes 168 connected at each end by tubular manifolds 170, 172. Conduit 174 is connected to the liquid refrigerant inlet manifold 170 while conduit 176 is connected to the gaseous outlet manifold 172. The conduit 176 is connected to an upper portion of the heat exchange structure 154 while the conduit 174 is connected to a lower portion thereof.

Pressure relief valve 178 is provided on structure 154. Two insulated conduits 180, 182 extend from structure 154 to a water storage tank and pump as previously described. The collector casing may contain one or several collector plates. A valve 184 is provided to shut off return of liquid refrigerant into the bottom of the collector when the temperature of the water in the heat exchange structures reaches a maximum desired temperature. In that case, all refrigerant will be boiled off the collector and condensed in the heat exchange structure and the system will not operate until the water temperature drops to a desired level. A sight glass 186 is conveniently provided in conduit 174 to measure the level of liquid refrigerant.

The advantage of the FIG. 6 construction is that both the collector and heat exchanger are provided as a single unit for simple mounting and can be readily precharged at the factory.

In the three systems above described, the differential control activating the water storage heater pump may be so designed as to cause circulation of water from the water heater tank and through the heat exchanger, should the heat exchanger temperature approach 32° F. in order to prevent freezing of the heat exchanger coil and connecting water lines. Very little heat will be taken from the water storage tank since the heat exchanger is insulated and heat can't be transferred back to the collector by the refrigerant gas.

In each of the three embodiments shown, the refrigerant is condensed in the closed vessel and the water passes through the coil. The connections may be reversed so that the refrigerant is condensed in the coil and the water passes through the closed vessel.

What I claim as my invention is:

1. A solar water heating system comprising a solar collector structure, a heat exchange structure, said heat exchange structure comprising a closed vessel, tubular means in said vessel, said tubular means having inlet and outlet means extending from said vessel, water storage means, said inlet and outlet means being connected to said water storage means, and pump means connected in one of said inlet and outlet means between said tubular means and said water storage means for circulation of water from said water storage means through said tubular means to heat same and thence back to said water storage means, means for circulating a refrigerant heat transfer medium in gaseous form from the collector structure to the interior of said closed vessel and in liquid form from the closed vessel to the collector structure thereby forming a solar energy system, and a refrigerant heat transfer medium in said solar energy system, said solar collector structure including refrigerant flow structure adapted for the flow of fluid refrigerant therethrough, said last mentioned structure having a lower portion adapted to be flooded with liquid refrigerant and an upper portion contiguous therewith to receive gaseous refrigerant which boils off the liquid refrigerant, electrical control means operative to discontinue operation of the system when the temperature of the water in the storage means reaches a predetermined level and to discontinue operation of this system when the temperature differential in the heat exchange structure is insufficient to cause effective transfer of heat for heating of water, the internal volume of said vessel being greater than the total internal volume of said solar collector structure and said tubular means connecting such vessel and said solar collector structure so that liquid refrigerant may be stored in the vessel during times when operation of the system is discontinued, said solar collector being located to receive sun rays.

2. A system as in claim 1, further characterized in that said vessel is an elongated cylindrical structure, said vessel being positioned with the longitudinal axis thereof being in generally the horizontal plane.

3. A system as in claim 1, further characterized in the provision of a receiver connected between the closed vessel and the collector for receiving liquid refrigerant from the closed vessel.

* * * * *